No. 729,217.  
Patented May 26, 1903.

UNITED STATES PATENT OFFICE.

ARNOLD RAHTJEN, OF HAMBURG, GERMANY.

PROCESS OF MAKING BROM INDIGO.

SPECIFICATION forming part of Letters Patent No. 729,217, dated May 26, 1903.

Application filed July 9, 1901. Serial No. 67,639. (Specimens.)

*To all whom it may concern:*

Be it known that I, ARNOLD RAHTJEN, chemist, a citizen of Germany, residing at 19 Mittelweg, Hamburg, Germany, have invented Improvements in Processes of Making Brom-Indigo; and I do hereby declare the nature of my said invention to be as follows.

I have discovered that, contrary to existing views and contrary to experiments made by others, brom derivatives of indigo are directly obtained from indigo of natural or artificial origin by adopting the usual methods which are applied to substitute the H atoms in the aromatic series by bromin.

*Example I—Monobrom indigo.*—One molecule of finely-powdered indigo is well saturated with organic or inorganic acids or with carbon bisulfid ($CS_2$) or such like suitable liquids, to which is added a solution of one molecule of bromin which has been mixed with the same solvent as used for saturating the indigo. The mixture is well stirred, and after the bromin is absorbed the monobrom indigo is separated, washed, and dried.

Monobrom indigo has about the same appearance as indigo. It is soluble in concentrated sulfuric acid with a yellowish-green color and sublimes like indigo. Monobrom indigo can be sulfurated by using concentrated sulfuric acid or similar agents.

*Example II—Dibrom indigo.*—One molecule of finely-powdered indigo is well saturated with organic or inorganic acids or $CS_2$ or such like suitable liquids, to which is added a solution of two molecules of bromin, being mixed with the same solvent as used for saturating the indigo. The mixture is well stirred, and after the bromin is absorbed the dibrom indigo is separated, washed, and dried.

Dibrom indigo has about the appearance of indigo. It is soluble in concentrated sulfuric acid with an emerald-green color. It sublimes as indigo. Dibrom indigo may be sulfurated by using concentrated $H_2SO_4$ or other similar agents.

*Example III.*—To five parts, by weight, of finely-powdered indigo are slowly added, at a low temperature, 6.1 parts, by weight, of bromin. Dibrom indigo is so formed, and hydrobromic acid is set free.

*Example IV—Monobrom indigo and dibrom indigo.*—One molecule of finely-powdered indigo, well saturated with $CS_2$ or with organic or inorganic acids, is brought into contact and well mixed with one-half or one molecule of bromin, respectively, at a low temperature, and one-half or one molecule of chlorin, respectively. Monobrom indigo and dibrom indigo are formed, and hydrochloric acid is set free.

I claim as my invention—

The process of obtaining brominated indigo which consists in reacting on indigo with bromin at a moderate temperature.

In testimony, that I claim the foregoing as my invention I have signed my name in presence of two subscribing witnesses.

ARNOLD RAHTJEN.

Witnesses:
 H. W. HARRIS,
 C. J. FOX.